3,225,107
SEPARATION PROCESS
Earl V. Kirkland, Springfield Township, Union County, N.J., and Joseph F. Jennings, Texas City, Tex., assignors, by mesne assignments, to Standard Oil Company, Chicago, Ill., a corporation of Indiana
Filed Aug. 24, 1960, Ser. No. 51,604
16 Claims. (Cl. 260—652)

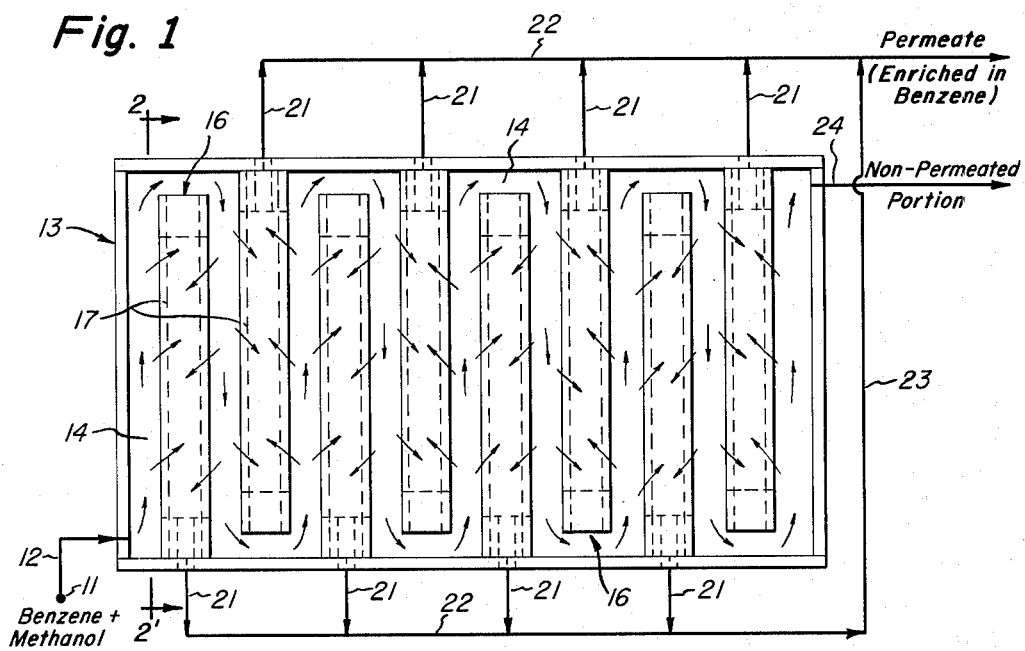
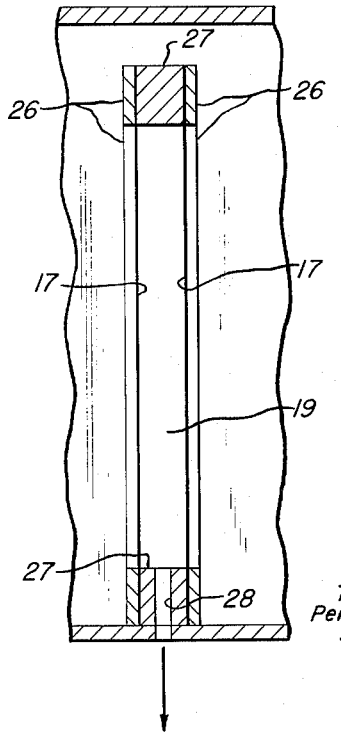
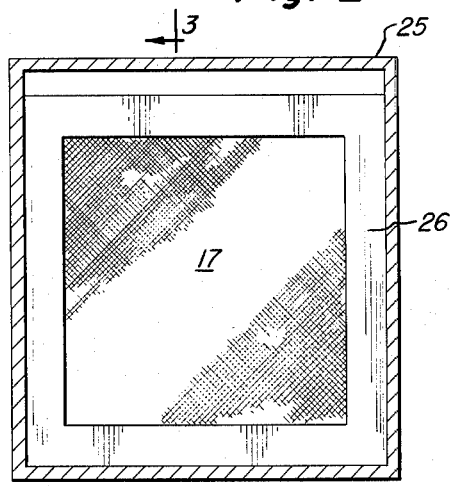
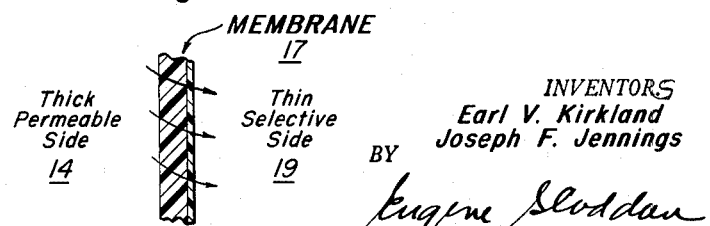

This application is a continuation-in-part of our copending application Serial No. 738,326, filed May 28, 1958, and now abandoned.

The present invention concerns a method for separating organic chemicals and in particular it concerns the use of a permeation process which employs improved permeation membranes.

An object of the present invention is to provide an improved method for separating organic chemicals. Another object is to provide a permeation process for separating organic chemicals, which permeation process uses novel permeation membranes. An additional object is to provide permeation membranes which display greater selectivity, efficiency and stability when used in a permeation process. A further object is to provide a permeation process for separating organic chemicals in which process modified polymeric films having improved separation characteristics are used as the permeation membranes. These and other objects will be more apparent from the detailed description of the invention.

It has been discovered that a polymeric film used in a permeation separation process can be improved with respect to either increasing selectivity for the organic chemicals being separated or increasing the rate of permeation, or both, by grafting a polymeric coating upon the one or both surfaces of the polymeric film. Also, it has been discovered that the polymeric film when used alone has improved permeation properties if, prior to use, it has been irradiated. Further, the properties of a permeation membrane can be improved by irradiating a polymeric film having a grafted polymeric coating thereon or irradiating the polymeric film and thereafter grafting upon the surface a polymeric coating.

As an illustration of the present invention, polyolefin films which have been modified by certain techniques are employed as the permeation membranes in the separation of organic chemicals by permeation. The polyolefin film, which may be a polymer or copolymer of ethylene, propylene, butene-1 and/or pentene-1, etc., is either modified by grafting thereon a polymerizable monomer, irradiated with ultraviolet light having a wave length in the range of 2000 to 4000 A., or given both treatments. It may then be used as the permeation membrane. In forming the graft coated membrane the polyolefin film, which is believed to have free radical reactive sites thereon as a result of one of the treatments hereinafter described, may be contacted with a monomer which reacts in the presence of free radicals and grafts itself onto the film surface. Alternate treatment of the film followed by contacting the film with the free radical reactive polymerizable monomer may be repeated in sequence a plurality of times to build up a thin or thicker layer upon the initial polyolefin film. The grafting may also be carried out by contacting the polyolefin film with the polymerizable monomer at the same time the film is being irradiated with ultraviolet light. A thin layer of the graft polymer upon the base polyolefin film may thus be formed. The graft polymer may be formed on both surfaces of the film, but it is preferred to form it upon only one surface of the film and then to arrange the film in the permeation apparatus so that the graft-surface forms one of the boundaries of the permeate zone and the graft-free surface forms a boundary of the feed zone. This arrangement provides improved efficiency of separation and optimum permeation rate of the modified film. In this process a permeation apparatus which is comprised of a feed zone that is sealed or separated from a permeate zone by the modified polyolefin film is used. The permeation apparatus is maintained under conditions causing permeation to occur when the feed mixture of organic chemicals is introduced into the feed zone. A portion of the mixture of the organic chemicals in the feed zone permeates through the modified polyolefin film and passes into the permeate zone. The permeated portion, which has a higher concentration of one of the components of the feed mixture than the concentration of this same component in the feed mixture, is rapidly removed from the permeate zone. The non-permeated portion is withdrawn from the feed zone.

The permeation membrane used in the process of the invention is modified polymeric film. Polymeric films may be prepared from solid polymers having either hydrophobic or hydrophilic characteristics. Examples of hydrophobic polymers which can be used are polyolefins of ethylene, propylene, butenes such as butene-1, pentenes such as pentene-1, or mixtures of such olefins; organic solvent-soluble cellulose derivatives as esters, such as propionate, butyrate, acetate butyrate and ethers as ethyl, propyl, butyl, methyl-amyl, as well as mixed esters-ethers; synthetic resins such as polyvinyl derivatives, acrylic acid derivatives, chloroprene, nylon, chlorinated rubber, polystyrene, neoprene and the like. Films of the hydrophilic class which may be used are those from regenerated cellulose, polyvinyl alcohol, cellulose hydrate, alkali-soluble water-insoluble cellulose ethers, nitrocellulose, hydrophilic cellulose esters, hydrophilic mixed esters and ethers of cellulose, casein, hydroxyl alkyl ethers, carboxy alkyl ethers, as well as mixtures thereof and the like. The solid polymers and/or copolymers are then formed into a film, usually of a thickness of between about 0.1 to 10 mils. Even thinner films than those indicated may be used, and the thinnest possible films which do not readily rupture are preferred since the rate of permeation increases as the thickness of the film is reduced. One method of modifying the polymeric film is by irradiating with ultraviolet light having a wave length of between 2000 to 4000 A., suitably between about 2000 to 3000 A. This wave length is frequently termed far ultraviolet light. The surface of the film is brought within the range of the ultraviolet light rays. Conventional ultraviolet light generators such mercury vapor lamps, tungsten arcs, Kromeyer lamps, Hanovia single-phase lamps, and the like may be used. The irradiation of the polymer causes chemical excitation of the molecules in the film, appears to produce reactive free radicals in the polymer, and causes some crosslinking of the polymeric film. The amount of ultraviolet light absorbed and the extent of free radical formation in the film can be increased by the presence of photosensitizers in the film. Photosensitive materials such as benzophenone, 4,4-dimethyl benzophenone, traces of metals, can be incorporated within the polymer prior to casting the film therefrom, or the photosensitizer can be coated on the film surface. This latter method may be accomplished by spraying or brushing a dilute solution of benzophenone or the like in a diluent such as benzene onto the film surface. Benzophenone, for example, absorbs light waves of approximately 2540 A. Thus, a polymer containing benzophenone will be modified by ultraviolet light irradiation and the process of modification will continue until the irradiation is discontinued or the benzophenone has been destroyed. The amount of irradiation can be varied from a few seconds to an hour or more. Either one side or both sides of the film may be irradiated.

While the ultraviolet light irradiation of the polymeric film improves the selectivity of the film when used as a permeation membrane for the separation of organic chemicals, the selectivity of the film can also be improved by grafting a polymeric coating upon the film surface and utilizing the graft coated film thereby formed or further treating the film by subjecting the graft coated film to ultraviolet light irradiation. Since the permeation rate through a selective film varies inversely with the film thickness, while the selectivity stays essentially constant, it is desirable to have the graft coating, which acts as the selective film, as thin as possible. However the graft coating must have enough thickness to give the barrier physical properties as well as a solubility effect. As long as the graft coating is essentially continuous the polymer will exhibit selectivity in a separation. Therefore grafting a selective polymer onto the surface of the polymeric film gives the same benefits of using a very thin selective film insofar as selectivity is concerned but has the additional advantage of high permeation rates if the polymeric film forming the base has a high permeation rate characteristic. Either one or both surfaces of the polymeric film may have the graft polymeric coating formed thereon. The graft polymeric coating is preferably formed on only one surface of the polymeric film and the finished grafted polymer is then placed in the permeation apparatus in a manner such that the surface of the film having the graft coating is in contact with and forms one boundary of the permeate zone and the opposite side of the film, which has no graft coating, forms one boundary of the feed zone. This arrangement maximizes the selectivity which is obtainable in permeation by the use of the grafted polymeric membranes. In such an arrangement, the polymeric film is typically between about 0.5 and 1.0 mil in thickness and the graft coating may be as thin as a monomolecular layer and is usually no thicker than about 0.1 mil.

There are several techniques of preparing the graft coating on the polymeric film. One method of preparing the grafted membranes consists of irradiating the film with ultraviolet light of 2000 to 4000 A. wave length and then contacting the irradiated film with a polymerizable monomer. Any of the polymeric films such as have been heretofore discussed can be used in this graft coating technique as the base film. When the ultraviolet light-irradiated base film is contacted by the polymerizable monomers, the monomers build up a polymeric layer by reacting with the activated film by a free radical mechanism. Therefore monomers which tend to polymerize by the free radical mechanism of catalysis may be used in forming the grafted polymeric film. The particular monomer and base film used in forming the grafted polymer will depend to a substantial extent upon the specific mixture of organic chemicals to be separated in the permeation process. A polymeric film having a high permeation rate for the component or components of the organic mixture to be separated is selected as the base film. Low selectivity and high permeability are desirable for this film. Since the solubility of different organic chemicals in any particular film varies from film to film, the solubility characteristic of the component to be separated is determined in a film considered for use as the base polymer. When once the base film has been selected then the polymerizable monomer to be used as the graft coating is selected from those having high selectivity for the organic chemical to be separated. Examples of some of the polymerizable monomers which may be used in forming the grafted polymer are acrylonitrile, acrylic acid, methyl acrylate, butadiene, isoprene, styrene, vinyl pyrrolidone, vinyl acetate, propylene and isobutylene, and solutions of polymers which act as polymerizable monomers, such as methyl cellulose, polyvinyl alcohol, polyesters, and cellulose acetate butyrate. In addition, stable graft polymers may be formed from monomers which yield polymers and copolymers soluble in the liquids to be permeated or ineffective for permeation of such liquids.

The base polymer having the graft coating upon its surface may be formed by first irradiating with ultraviolet light of the above defined wave length and then contacting the irradiated film with the polymerizable monomer, repeating the irradiation, then contacting the film again with the polymerizable monomer, and continuing to repeat the sequence of treatments until a graft coating of the desired thickness is built upon the polymeric base film. The polymerizable monomer can be contacted with the irradiated polymeric film either by brushing it on the film surface, by spraying it thereon, etc. A photosensitizer can be applied to the film before the various irradiation treatments to increase the formation of free radicals upon the film surface.

Instead of using the sequence of ultraviolet irradiation followed by contacting the irradiated film with the polymerizable monomer, both of these steps may be carried out simultaneously. Thus the surface of the film may be previously treated with the polymerizable monomer and the treated film thereafter subjected to the ultraviolet irradiation. If desired the film may be irradiated and during the course of the irradiation with ultraviolet light there may be sprayed upon the surface being irradiated a dilute solution of the polymerizable monomer.

Other techniques for applying various graft coatings to the base polymeric film may be used. In general, the bonding of the graft coating can be caused by reactions which are peroxide or free radical initiated or ionic initiated. As an example of the free radical initiated grafting, the surface of a base film is treated with a redox initiator such as a persulfate of ammonium, potassium or sodium reacted with a meta-bisulfite such as sodium meta-bisulfite. In this method the surface of the film is treated with the initiator which generates free hydroxyl radicals that are capable of abstracting hydrogen from the surface, thus forming free radicals on the surface of the film. After the free radicals are formed on the surface, a solution of the polymerizable monomer is brought in contact with the surface whereupon a polymerized coating is formed. Another method utilizes a peroxide coating such as benzoyl peroxide, ditertiary butyl peroxide or hydrogen peroxide to form the free radical on the base film. The peroxide in this case is activated by heating such as with flame impingement or heat lamps. The free radicals are formed on the surface of the film and thereafter the polymerizable monomer is brought in contact with the surface thus forming a graft coating.

FIGURE 1 shows in diagrammatic form a cutaway view of a permeation apparatus and its use in concentrating or separating benzene from a mixture of benzene and methanol.

FIGURE 2 is a cross-sectional view taken along lines 2–2' of the permeation apparatus of FIGURE 1 and shows one permeation unit in detail.

FIGURE 3 is a cross-sectional view taken along lines 3–3' of the permeation cell shown in FIGURE 2.

FIGURE 4 is a cross-sectional view of permeation membrane 17 (a polymeric film) which has been grafted with a polymeric coating.

Referring to FIGURE 1, the feed mixture consists in percentages by weight of 60.9% benzene and 39.1% methanol. This mixture is a difficultly separatable composition which is obtained by the azeotropic distillation of a mixture of benzene and methanol. This mixture is passed through source 11 by way of line 12 into the interior of permeation vessel 13. In this embodiment the feed mixture is introduced at a temperature of about 100°

C. and under sufficient pressure to maintain the feed mixture in the liquid state. The interior portion of the permeation vessel 13 into which this mixture is introduced is called the feed zone 14 of the permeation apparatus. Within the permeation vessel are positioned a number of permeation cells 16. These permeation cells have a hollow interior. The cells are completely sealed off from the feed zone 14 and none of the liquid in feed zone 14 can pass therefrom into the hollow interior of the permeation cells 16 except by permeating through the polymeric permeation membrane 17 which forms two faces of each permeation cell. The permeation membranes 17 are films of polypropylene which have been irradiated with ultraviolet light of 2000–4000 A. wave length. These films are of two mil thickness. The permeation cells are alternately suspended from the bottom and the top of permeation vessel 13 so as to provide a tortuous path for the feed as it progresses from the inlet 12 to a point which is remote from the inlet and from which the non-permeated portion is withdrawn. Since the benzene permeates preferentially through the permeation membranes 17, it is obvious that the concentration thereof in the mixture in the feed zone will diminish as the mixture passes along the tortuous path and is withdrawn as the non-permeated portion. The purpose of the tortuous path is to minimize backmixing, for backmixing tends to reduce the degree of separation that is attainable.

The mixture in feed zone 14, under the conditions described in this embodiment, is maintained in the liquid state. A lower pressure is maintained within the interior (permeate zones 19) of permeation cells 16. In this embodiment, atmospheric pressure is maintained within permeate zones 19. The pressure in permeate zones 19 is such that vaporization of the permeating mixture occurs as soon as it passes through the membrane. This permeating mixture of benzene and methanol has a higher concentration of benzene than the concentration of benzene in the feed mixture introduced from source 11. The permeated portions are rapidly withdrawn from permeate zones 19 of each of the permeation cells 16 and are passed by way of lines 21 into headers 22. These headers 22 are connected by line 23 and the permeated portion is withdrawn therefrom, condensed by means not shown herein, and passed to storage. The permeate is rich in benzene, e.g. contains about 85 weight percent thereof and only about 15 weight percent methanol. By permeating this permeated portion through one or more additional permeation stages, permeate fractions can be recovered therefrom which are substantially pure benzene. The non-permeated portion is withdrawn from permeation vessel 13 by way of line 24. It is reduced in its benzene concentration and has a higher concentration of methanol (based on total feed) then is contained in the feed mixture introduced from source 11. It may likewise be processed in subsequent permeation stages to remove final amounts of benzene therefrom. A non-permeated portion which is almost total methanol is recoverable.

While the irradiated polyolefin film yields a permeate enriched in benzene, polyolefin films grafted, as shown in FIGURE 4, with suitable monomers yields a permeate containing an even higher proportion of benzene. In the above embodiment, a polyolefin film with a graft polymer coating, made by the ultraviolet technique described previously, yields a permeate containing even more than 86% benzene.

Referring now to FIGURE 2, permeation vessel 13 is depicted herein as being of square or rectangular cross section. It may be of circular or other shape if desired, since the shape has no bearing upon the operation or effectiveness of the process. The thickness of permeation vessel 13 is depicted herein by 25. Retaining ring 26 holds permeation membrane 17 in place within the permeation cell 16.

FIGURE 3 shows an enlarged cross section of permeation cell 16 which is taken along lines 3–3' of FIGURE 2. Spacer ring 27 separates the two permeation membranes 17 which are positioned on opposite sides of spacer ring 27. Retaining rings 26 are of the same shape as spacer ring 27 and compress permeation membranes 17 against retaining ring 26 thereby forming a leak-proof permeation cell through which the organic chemicals cannot pass except by permeating through membranes 17. A passage way 28 through the bottom of spacer ring 27 permits permeate vapors within permeate zone 19 to pass down through the passage way into connecting line 21 by which the vapors pass into manifolding line 22. When a large pressure differential is maintained between the feed zone and the permeate zone, a membrane supporting means may be positioned within the permeate zone to provide support for permeation membranes 17. This supporting means may be a porous solid, close-mesh screen or the like.

In the embodiment described herein the mixture of organic chemicals is maintained in the liquid state in the feed zone and the permeated portion is removed in the vapor state from the permeate zone. This is a preferred method of operation. If desired, the mixtures of organic chemicals in both of these zones may be maintained in the vapor state, or they may be maintained in both zones in the liquid state. It is to be remembered that in any mode of operation the permeated portion should be rapidly removed from the permeate zone, for if the permeated portion is allowed to remain in contact with the permeation membrane for a long period of time the mixtures on the opposite sides of the membrane will reach equilibrium and permeation will no longer occur. The permeation temperature is preferably maintained as high as possible since the rate of permeation increases as the permeation temperature is increased. Temperatures of from 50 to 400° F. and even higher may be used, depending to some extent upon the mixture being separated. Obviously the temperature of permeation should not be so high as to cause the membrane to be ruptured easily. Many other mixtures of organic chemicals, in addition to the mixture employed in the embodiment described above, can be separated by means of this invention. For example, feed mixtures of iso-octane-ethanol, benzene-cyclohexanol, heptane-butanone-2, hexanethiolcarbon disulfide, various mixtures of hydrocarbons, etc. can be charged as the feed mixture. Either wide or close boiling mixtures may be charged, and even azeotropic mixtures or other close boiling mixtures may be used as charge stocks. Mixtures of hydrocarbons such as a mixture of aromatic and non-aromatic hydrocarbons may be charged and a permeate enriched in aromatics will be produced. Mixtures of naphthenes and branched chain paraffins can be permeated to recover a permeated portion which is enriched in naphthenes. Straight chain and branched chain hydrocarbons can be permeated to recover a permeate which has a higher concentration of straight chain hydrocarbons than was contained in the feed mixture. A permeate enriched in olefins can be obtained from a charge mixture of olefins and paraffins. In general, wide varieties of oil-soluble organic chemicals can be separated from each other and/or from water-soluble organic chemicals.

A number of experiments were carried out which demonstrate the present invention. In the first series of experiments polyethylene films of 1.8 mil thickness (in Run 5 the thickness was 1.5 mils) some of which films had been irradiated with ultraviolet light, some irradiated with a high energy electron dosage, and some of which were not subjected to any irradiation whatsoever, were evaluated in permeation runs for the separation of a feed mixture consisting of 75 weight percent methylene dichloride and 25 weight percent neohexane. Permeation runs were carried out at various temperatures while maintaining the mixture in the feed zone in the liquid state by the application of pressure thereto if required. Permeate was withdrawn into the permeate zone which was maintained at 150 mm. Hg abs. to insure that the permeated material was in the vapor state. The permeate vapors were rapidly and continuously withdrawn in the batch permeation runs which were carried out. The composition of the permeate was then determined. In Runs 1 and 2 the polyethylene permeation membrane was one which had not been subjected to any irradiation whatsoever. In Runs 3 and 4 the same polyethylene was sprayed with a 1% solution of 4,4′-dimethyl benzophenone in benzene (containing less than 1% of Triton X–100 to improve wetting of the film) and thereafter was irradiated with ultraviolet light. A 500 watt Hanovia single-phase lamp (which emitted ultraviolet light of 2000 to 4000 A. wave length) was placed about six inches from the polyethylene film and irradiation was carried out for about one-half hour. Each side of the film was so irradiated. In Run 5 the polyethylene film was subjected to 15 megareps of high energy electrons from a high voltage accelerating apparatus such as a Van de Graaff accelerator. In Run 6 the polyethylene film was likewise subjected to irradiation from a high energy electron source, but the extent of irradiation was 100 megareps. The composition of the permeate fractions and the permeation rates for the various runs are shown in Table I which follows.

*Table I*

| Run No. | Irradiation | Permeation Temp., °C. | Vol. percent $CH_2Cl_2$ in Permeate | Permeation Rate [1] |
|---|---|---|---|---|
| 1 | None | 52 | 85.6 | 101 |
| 2 | None | 70 | Membrane ruptured. | |
| 3 | UV | 52 | 90.0 | 91 |
| 4 | UV | 125 | 82.7 | 1,290 |
| 5 | 15 megareps [2] | 120 | 79.8 | 1,178 |
| 6 | 100 megareps [2] | 120 | 80.8 | 1,148 |

[1] In gallons/hr./1,000 sq. ft. of membrane surface.
[2] High energy electron beam.

By comparing Runs 1 and 3, which were carried out under identical conditions, it is evident that ultraviolet light irradiation improves the selectivity of the polyolefin permeation membrane. By comparing Runs 4, 5 and 6, it is evident that ultraviolet light irradiation improves the selectivity of the permeation membrane to a greater extent than does irradiation by high energy electron dosages. The membrane used in Run 2 ruptured since it was unstable at temperatures above 70° C., whereas the ultraviolet light irradiated membrane was stable even when used at temperatures of 140° C. and higher. This points out an additional advantage for the ultraviolet light irradiated polyolefin membranes since they may be used at higher temperatures and permeation rates which are many fold higher can thereby be obtained.

A second series of batch permeation runs was carried out in the same general manner as was used in obtaining the data reported in Table I. The results of Runs 3 and 4, in which an ultraviolet light irradiated polyethylene membrane was used, are reported again in Table II together with runs in which graft coated polyethylene membranes were employed. The graft coated polyethylene membranes were prepared by spraying one surface of a polyethylene film with a benzene solution of benzophenone (about 1%) containing a trace of wetting agent, drying the film, irradiating the sprayed side with ultraviolet light for about thirty minutes, and then spraying on the polymerizable monomer onto the irradiated side of the film. After drying, the film was again irradiated and then sprayed with more of the polymerizable monomer. Spraying with the monomer was done twice in preparing the film used in Runs 7 and 8, and the spray of the monomer onto the film was done four times in preparing the membrane used in Runs 9–14. Finally, both sides of the film were irradiated with ultraviolet light to stabilize the graft copolymer. The films were then evaluated using the same 75 weight percent methylene dichloride and 25 weight percent neohexane feed mixture.

*Table II*

| Run No. | Grafting Monomer | Permeation Temp., °C. | Graft Side Contacts | Permeate Wt. percent $CH_2Cl_2$ | Rate [1] |
|---|---|---|---|---|---|
| 3 | None | 52 | | 90.0 | 91 |
| 4 | do | 75 | | 85.5 | 534 |
| 7 | Acrylonitrile | 54 | V [2] | 91.0 | 106 |
| 8 | do | 75 | V | 87.0 | 488 |
| 9 | Acrylic Acid | 49 | V | 95.0 | 107 |
| 10 | do | 79 | V | 85.0 | 549 |
| 11 | Methyl Acrylate | 48 | V | 95.6 | 69 |
| 12 | do | 75 | V | 91.0 | 405 |
| 13 | do | 53 | L [3] | 88.0 | 65 |
| 14 | do | 73 | L | 85.0 | 318 |

[1] Permeation rate in gallons/hr./1,000 sq. ft. of membrane surface.
[2] V indicates that the side of the membrane having the graft coating was next to the vapor or permeate zone.
[3] L indicates that the side of the membrane having the graft coating was next to the liquid or feed zone.

A third series of experimental permeation runs to illustrate the use of a hydrophilic film were conducted in the same general manner as was used in obtaining the data reported in Table I. Methyl cellulose was chosen as a base film. An 0.8 mil film of this polymer was cast from a water solution on a glass panel and dried under a heat lamp. The surface of the film was treated with a redox initiator (the reaction of a persulfate and a metabisulfite) thus forming free radicals on the surface by extracting hydrogen from the methyl cellulose. A 2% aqueous solution of polyvinyl alcohol was immediately cast upon the surface of the treated film. The film with its coating was dried a second time with a heat lamp. Two graft films were prepared in this manner. One was a 1.0 mil film and the other 1.2 mils. These films were evaluated for the separation of water from isopropanol under permeation conditions using a temperature of 100° C., a liquid feed and a permeate zone pressure of 38 mm. of mercury. The aqueous isopropanol was 92.5 weight percent isopropanol and 7.5 weight percent water. The results are shown in Table III.

*Table III*

| Film | Graft | Thickness, mils | Permeate Wt. percent water | Rate [1] |
|---|---|---|---|---|
| Methyl cellulose | None | 0.8 | 20 | 220 |
| Do | Polyvinyl alcohol | 1.0 | 82.5 | 245 |
| Do | do | 1.2 | 96.0 | 144 |
| Polyvinyl alcohol | None | 1.2 | 84.0 | 51.5 |

[1] Permeation rate in gallons/hr./1000 sq. ft. of membrane surface.

Thus it can be seen from the above data that a methyl cellulose film with a polyvinyl alcohol graft coating gives better selectivity and rate than either polymer alone.

As a further demonstration of the superiority of grafted films a hydrophobic graft coating was bonded on the surface of a hydrophilic base film and the thus-formed grafted film was used to make a hydrophobic separation. Methyl cellulose was grafted with vinyl acetate using benzoyl peroxide in dioxane solution as the initiator. The permeation experiments were carried out in the same general manner as previously described. The films were prepared by wetting the surface of the methyl cellulose with the benzoyl peroxide solution. The films were then placed under a heat lamp to initiate the reaction and vinyl acetate was swabbed over the surface while the film was exposed to the heat lamp. This graft film was used as the membrane in a permeation run in the separation of a 50–50 by weight mixture of benzene and cyclohexane. The temperature of the permeation was 100° C., the feed was maintained in the liquid phase and the pressure in the permeate zone was 30 mm. of mercury. The film was 0.9 mil in thickness. Using this methyl cellulose film coated with vinyl acetate, the permeate was 81 weight percent benzene and the permeation rate was 308 lbs./hr. 1000 sq. ft. It is evident that the grafted polymeric membranes have a higher degree of selectivity and permeation rate in permeation than does the ultraviolet light irradiated permeation membrane when used alone. Further the polymeric films when irradiated have better permeation properties than the unirradiated polymeric films. The greater is the improvement in selectivity, the more desirable is the membrane since it minimizes the number of permeation stages which may be necessary to achieve a given degree of separation, thereby reducing equipment and operating costs in the permeation process. It should also be noted that when the graft coating formed a boundary of the permeate zone it resulted in obtaining a much greater degree of selectivity of separation than when the film was reversed so as to have the graft coating in contact with the liquid feed mixture in the feed zone.

What is claimed is:

1. A process for separating a mixture of organic chemicals which process comprises introducing a liquid feed mixture of organic chemicals into the feed zone of a permeation apparatus, said permeation apparatus being comprised of a feed zone which is sealed from a permeate zone by a polymeric film onto the surface of which has been grafted a polymeric coating, permeating a portion of the mixture in the feed zone through the film into the permeate zone, rapidly withdrawing the permeated portion from the permeate zone, said permeated portion having a higher concentration of one of the components of the feed mixture than the concentration of the same component in the feed mixture, and withdrawing a non-permeated liquid portion from the feed zone.

2. The process of claim 1 in which the polymeric film has only one surface grafted with the polymeric coating.

3. A process for separating a mixture of organic chemicals which comprises introducing a liquid feed mixture of organic chemicals into the feed zone of a permeation apparatus, said permeation apparatus being comprised of a feed zone which is sealed from a permeate zone by a hydrophobic polyolefin film onto the surface of which has been grafted a polymeric coating, permeating a portion of the mixture in the feed zone through the film into the permeate zone, rapidly withdrawing the permeated portion from the permeate zone, said permeated portion having a higher concentration of one of the components of the feed mixture than the concentration of the same component in the feed mixture, and withdrawing a non-permeated liquid portion from the feed zone.

4. The process of claim 3 wherein the polyolefin film has a graft coating on only one surface thereof and the film is so employed in the permeation apparatus that the surface of the polyolefin film having the grafted coating thereon is in contact with the permeate zone and the opposite surface of the polyolefin film onto which no coating has been grafted is in contact with the feed zone.

5. The process of claim 3 wherein the polyolefin film having a grafted polymeric coating is prepared by subjecting the surface of the film to irradiation by ultraviolet light of 2000 to 4000 A. wave length and contacting the surface of the irradiated film with a polymerizable monomer which is polymerizable by free radical catalysis.

6. The process of claim 3 wherein the polyolefin film having the grafted coating thereon is prepared by subjecting the surface of the film to ultraviolet light of 2000 to 4000 A. wave length followed by contacting the irradiated surface with a monomer which is polymerizeable by free radical catalysts, the sequence of ultraviolet light treating and contacting with polymerizable monomer being repeated to build up a graft coating no thicker than about 0.1 mil on the surface of the polyolefin film.

7. The process of claim 3 wherein the polyolefin is polyethylene.

8. The process of claim 3 wherein the polyolefin is polypropylene.

9. The process of claim 3 wherein the polymeric coating is derived from acrylonitrile.

10. The process of claim 3 wherein the polymeric coating is derived from methyl acrylate.

11. The process of claim 3 wherein the polymeric coating is derived from vinyl acetate.

12. The process of claim 3 wherein the polymeric coating is derived from polyvinyl alcohol.

13. The process of claim 5 wherein the polyolefin film is a polyethylene film which contains a photosensitizer.

14. The process of claim 5 wherein the feed mixture is a mixture of oil soluble organic chemicals.

15. The process of claim 5 wherein a mixture of methylene dichloride and neohexane is used as the feed mixture.

16. A process for separating methylene dichloride from neohexane which comprises introducing a liquid feed mixture of methylene dichloride and neohexane into the feed zone of a permeation apparatus, said permeation apparatus being comprised of a feed zone which is sealed from a permeate zone by a permeation membrane which is comprised of a polyethylene film having a grafted methyl acrylate coating on one surface thereof, said permeation membrane being disposed in the permeation apparatus in a manner such that the grafted coating is in contact with the permeate zone and the opposite surface of the polyethylene film which has no graft coating is in contact with the feed zone, said permeation membrane being prepared by subjecting the surface of the polyethylene film to irradiation by ultraviolet light of 2000 to 4000 A. wave length and thereafter contacting the irradiated surface with methyl acrylate monomer and repeating the sequence of irradiation and contacting with the monomer and thereby forming a grafted coating no thicker than about 0.1 mil, permeating a portion of the mixture in the feed zone through the permeation membrane into the permeate zone, rapidly withdrawing a vaporized permeated portion from the permeate zone, said permeated portion having a higher concentration of methylene dichloride than the concentration of methylene dichloride in the feed mixture, and withdrawing a non-permeated liquid portion from the feed zone.

References Cited by the Examiner

UNITED STATES PATENTS

| | | | |
|---|---|---|---|
| 2,593,540 | 4/1952 | Cornwell et al. | 210—23 |
| 2,878,519 | 3/1959 | Wolinski | 204—162 |
| 2,958,656 | 11/1960 | Stuckey | 210—500 |
| 2,958,657 | 11/1960 | Binning et al. | 210—500 |
| 2,960,462 | 11/1960 | Lee et al. | 210—500 |
| 2,984,623 | 5/1961 | Lee et al. | 210—500 |
| 2,985,588 | 5/1961 | Binning et al. | 210—500 |
| 2,999,772 | 9/1961 | Burk et al. | |

OTHER REFERENCES

Bockhoff et al.: Eng. Chem., September 1955, pp. 228–234.

MORRIS O. WOLK, *Primary Examiner.*

ALPHONSO D. SULLIVAN, *Examiner.*